April 28, 1942.     D. U. SHAFFER     2,281,389
ROTARY RELEASING FISHING TOOL
Original Filed Oct. 26, 1940
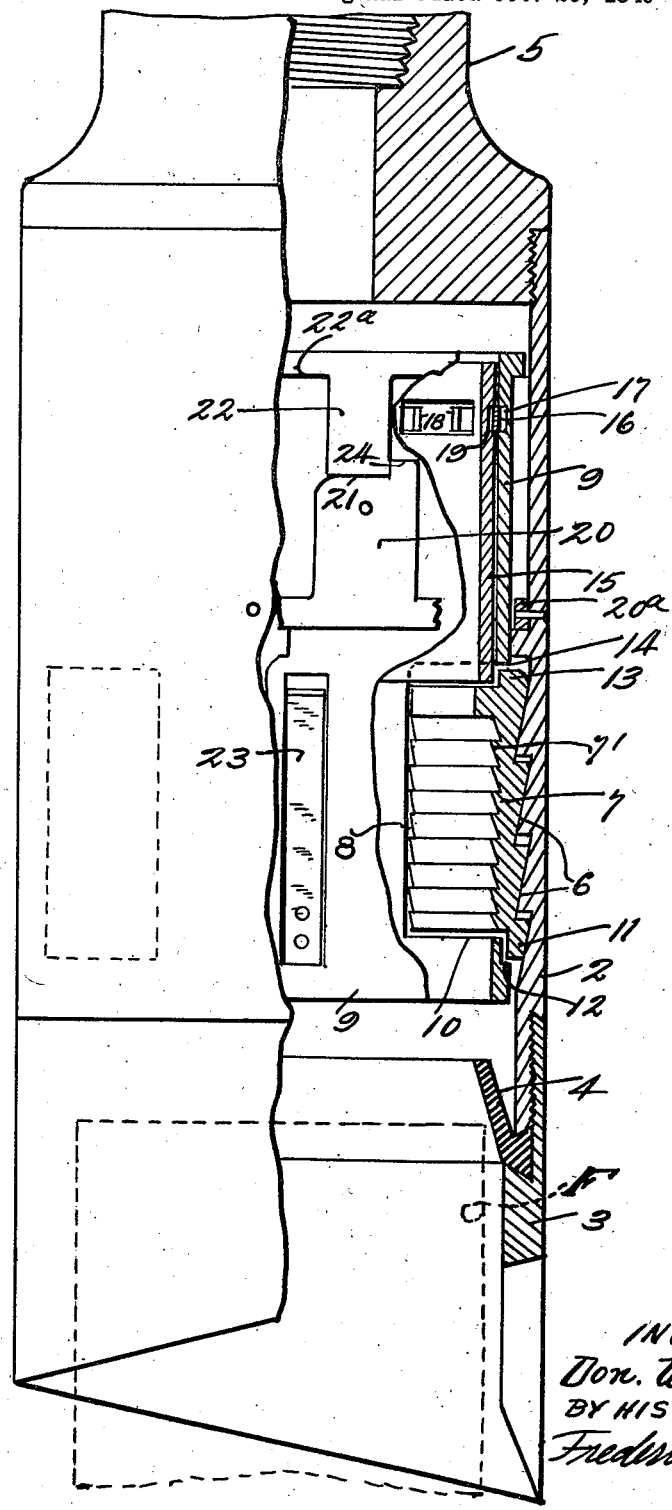
INVENTOR,
Don. U. Shaffer;
BY HIS ATTORNEY,
Frederick E. Maynard.

Patented Apr. 28, 1942

2,281,389

UNITED STATES PATENT OFFICE 2,281,389

ROTARY RELEASING FISHING TOOL

Donald U. Shaffer, Brea, Calif., assignor to Shaffer Tool Works, Brea, Calif., a corporation of California Substituted for abandoned application Serial No. 362,965, October 26, 1940. This application October 25, 1941, Serial No. 416,554

7 Claims. (Cl. 294—102)

This invention is a deep well tool more especially for fishing out tubular or other parts that may have been frozen in a hole.

A general object of the invention is to provide a fishing tool of few and simple parts, of easy and reliable operation in application and adjustment and which includes a set of gripping slips controlled by operation of telescopic tool parts of the assembly, and provide means for effecting the retraction and locking of the slips in a retracted position for ready withdrawal of the tool device from a frozen fish in the event that the fish cannot be pulled out by the tool.

The invention consists in certain advancements in this art as set forth in the ensuing disclosure and having, with the above, additional objects and advantages as hereinafter developed, and whose constructions, combinations, and details of means, and the manner of operation will be made manifest in the description of the herewith illustrative embodiment; it being understood that modifications, variations and adaptations may be resorted to within the scope, spirit and principle of the invention as it is more particularly claimed hereinafter.

The figure of the drawing is an axial section, partly in side elevation.

The invention is, in the present adaptation, incorporated in a well fishing implement having a tool part 2, here in the form of a fishing tool whose length and diameter is determined by the diameter of the fish to be recovered; the part 2 having its lower end open and provided with a shoe 3 to telescope over and encompass the upper end of a fish F (dotted lines) as the tool is lowered.

A fluid pressure closed, annular packer 4 is fixed in the bowl part 2 to seal on the interposed fish F.

The upper end of the part 2 is secured to a pin receiver 5 for attachment to a rotatable tool string by which the tool is lowered or raised, or rotated as may be desired, and presently set forth.

The bore face of the part 2 is provided with a series of annularly equi-spaced, longitudinal rows of downwardly and inwardly converged cams 6 and opposite to each row is a complementary cam-faced, longitudinal slip 7. These slips are of cross-sectional shape to fit a given fish and are disposed in the respective pockets 8 in an annular cage 9 which is provided with a set of ledges 10 on which the lower ends of the slips may rest. The slips have bottom toes 11 mortised loosely into recesses 12 in the cage ledges 10. The upper ends of the slips have crown prongs 13 which loosely mortise into a respective recess formed by a pocket edge 14 and a slip retainer-ring 15 movably fitting the cage and interlocked against longitudinal shift by a cross-split, spring-ring dowel 16 normally expanding into an internal, peripheral channel 17 in the cage and being contractive by clinching its spaced ends 18 into a groove 19 cut around the retainer ring 15.

By contracting the ring dowel 16 the ring 15 may be shifted out of the way of the prongs 13 and the slips can be extracted from the pockets 8 in the cage.

The tool part 2 is capable of axial motion as to the cage 8 which holds the slips. When the tool device is being lowered with and by a string stem the slips are preferably locked in an ineffective position as to their opposite cams 6 of the tool part 2 so that the slips will not grab onto a fish as the tool is lowered or as it may be raised. Means are here provided to lock the slips out of commission and to effect their release for normal gripping function on a fish, and for the safe release of the slips in event the fish cannot be pulled loose from the hole formation or other holding cause.

The slip control means here shown includes a parallel-side, wall block 20 fixed or formed on the cam carrying part 2, in this case in the bore thereof, and having plane end shoulder 21 shown as in axial opposition to a like parallel-side, wall block 22 of the cage 5 and in this position preventing relative axial motion of the tool part 2 and the cage 9. The cage is provided with a set of suitable friction springs 23 and when the tool has been lowered to the desired position in a hole to catch a fish these springs 23 function to bind on the fish with enough pressure to hold the cage against rotation on the fish and to some extent against relative axial shift thereon. Therefore, if the tool part 2 is rotated by the string stem to the left (looking down on top of the tool) the block 20 will pass from under the block 22 of the cage and the tool part 2 may be axially shifted so that the cams 6 will engage and radially shift the slips so that their teeth 7' will bite into the contiguous surface of the fish in the hole.

Rotation, to the right, of the stop block 20 is prevented by a nog 24, on the upper part of the block 20 of part 2, which side strikes the interposed block 22 of the frictionally held cage 9, but after the block 20 has been rotated from below the block 22 then the tool part 2 may be rotated to either right or left until the side of block 20 strikes the now peripherally registered block 22; the blocks 20 and 22 now being in a common transverse orbit.

If it is found that the fish cannot be pulled out then the tool part 2 is lowered to bring the block 20 below the plane of the block 22 of the frictionally held cage and then the tool stem and part 2 are rotated to the right (looking down) until the nog 24 strikes the block 22 to locate the blocks in end register. At this arrangement the several slips 7 are free from the pressure of the cams 6 and can shift radially from the surface of the fish and the whole tool assembly may be pulled safely without the slips gripping the fish.

The new slip lock device is capable of ready embodiment in other slip carrying tools.

The axial shift of the tool part 2 relative to the cage part 9 is suitably limited, as by the stop shoulder 12 engaging the slips, so that the cage block 22 cannot be moved to a position over the top end of the locking nog 24. When the blocks 20 and 22 are turned out of axial alignment the tool part 2 may be pulled up relative to the block 20 until the nog 24 abuts endwise onto an annular ridge 22a of the cage 9.

The block 20 may be formed as a separate piece including a ring 20a suitably fixed to the tool part 2 to be a unit therewith.

In operation and use of the tool the cage 9 is locked in the position shown in the drawing so that the slips are expanded and will not grip on a fish, upon either motion of the tool axially, but the springs 23 will bind with the desired degree on the fish as the tool is lowered. When the slips are at the desired level in the hole and as to the fish then the tool part 2 is rotated left to turn the block 22 from the top of the locking block 20 and the annular set of slips 7 and the cage 9 will freely drop until the slips set on the fish. The tool is now pulled up so that the slips will bite into the fish and lift it if possible. If the fish cannot be pulled, that is moved up, then the tool part 2 is lowered and the slips released from bite and the block 20 is again adjusted, by rotation of the tool, under the block 22 of the stationary cage 9, and then the whole assembly is pulled out of the hole, without the fish.

What is claimed is:

1. A fishing tool of the class described including a pair of relatively axially shiftable assemblies one including a slip cage having longitudinally deep blocks fixed on its upper wall portion and the other having a locking means to positively hold the cage in a slip retracting position and which is rotative relative to the cage and includes a part whereby to fully release the cage for a full and unobstructed axial shift stroke instantly upon a slight turn of the lock means from engagement with the coordinate cage; said locking means including isolate, axially long, longitudinal lugs with plane meeting ends to abut the cage blocks, and means on one lug to prevent rotation of the lugs relatively in one direction; the cage having closed top recesses for the lugs.

2. The tool of claim 1, and said locking means operative to provide for relative rotation of the assemblies without any axial shift effect after the lugs are axially disaligned from the blocks.

3. A fishing tool of the class described including a pair of concentric assemblies one of which includes a slip cage rotative and slidable on and relative to the other and the assemblies each having cooperative end shift lock means and each having clearances providing for free rotation of the assemblies without axial reaction when the lock means are disaligned and providing for axial shift for a full stroke extent and said means including isolate, cooperative long blocks in their respective clearances having parallel, longitudinal walls.

4. The tool of claim 3, and stop means on the end of one of the mutual blocks to prevent full rotation of the assemblies relatively.

5. In a fishing tool, a cage, a set of slips mortised in the cage, a retainer ring for the slips, and a split ring dowel normally interlocking the retainer and the cage and being contractive to effect their mutual release.

6. In a fishing tool, an exterior body member, an interior cage, a set of camming slips fitted on the bore of the body and mortised in the cage, lug means interposed between the cage and the body, cooperative to hold the cage in a slip retracting position, and the cage and the body being relatively rotative to disengage the lug means relatively and permit operation of the slips, and a retainer ring-dowel and ring device mounted in the cage; the ring being removable to provide for dismounting the slips.

7. In a fishing tool of the class set forth; a tubular external body having slip cams in its bore, a cage in the body chamber having a set of slips to engage said cams and having pockets through which the slips may be dismounted inwardly, means to secure the slips in effective positions in the pockets, a series of locking blocks fixed in the bore of the said body and provided with plane surface abutment ends having stop nogs, and the cage having an annular, lateral ridge from which extends laterally isolate, elongate lock blocks having plane surface ends to abut the said body blocks; the cage and the said body being relatively turnable to aline or disaline the locking blocks of each.

DONALD U. SHAFFER.